United States Patent
Roy et al.

(10) Patent No.: US 10,761,838 B2
(45) Date of Patent: Sep. 1, 2020

(54) GENERATING UNIFIED AND DYNAMICALLY UPDATABLE APPLICATION PROGRAMMING INTERFACE DOCUMENTATION FROM DIFFERENT SOURCES

(71) Applicant: Dell Products L.P., Round Rock, TX (US)

(72) Inventors: Mainak Roy, Bangalore (IN); Chitrak Gupta, Bangalore (IN); Abhirup Seal, Kolkatta (IN)

(73) Assignee: Dell Products L.P., Round Rock, TX (US)

( * ) Notice: Subject to any disclaimer, the term of this patent is extended or adjusted under 35 U.S.C. 154(b) by 205 days.

(21) Appl. No.: 16/051,164

(22) Filed: Jul. 31, 2018

(65) Prior Publication Data

US 2020/0042316 A1    Feb. 6, 2020

(51) Int. Cl.
    *G06F 17/00*      (2019.01)
    *G06F 8/73*      (2018.01)
    (Continued)

(52) U.S. Cl.
    CPC .............. *G06F 8/73* (2013.01); *G06F 16/313* (2019.01); *G06F 16/3334* (2019.01);
    (Continued)

(58) Field of Classification Search
CPC ............ G06F 16/3338; G06F 16/3334; G06F 16/313; G06F 16/93; G06F 16/38; G06F 8/73
See application file for complete search history.

(56) References Cited

U.S. PATENT DOCUMENTS 6,212,530 B1    4/2001    Kadlec
7,096,420 B1    8/2006    Peikes
(Continued)

OTHER PUBLICATIONS

Tensor Layer Contributors, "API—Natural Language Processing—TensorLayer 1.9.0 Documentation," http://tensorlayer.readthedocs.io/en/latest/modules/nlp.html, downloaded on Jun. 27, 2018, 10 pages.

(Continued)

*Primary Examiner* — Greta L Robinson
(74) *Attorney, Agent, or Firm* — Ryan, Mason & Lewis, LLP (57) ABSTRACT

A method in one embodiment comprises generating a document corpus comprising a plurality of application programming interface electronic documents, wherein the plurality of application programming interface electronic documents are organized according to one or more application programming interface versions, receiving a query from one or more users seeking information corresponding to one or more application programming interfaces, generating a subset of the plurality of application programming interface electronic documents from the database in response to the query using one or more code artifacts, retrieving data corresponding to the one or more application programming interface versions, dynamically modifying one or more of the plurality of application programming interface electronic documents in the subset of the plurality of application programming interface electronic documents based on the retrieved application programming interface version data, and transmitting the subset of the plurality of application programming interface electronic documents to the one or more users.

20 Claims, 7 Drawing Sheets

(51) Int. Cl.
 G06F 16/38 (2019.01)
 G06F 16/93 (2019.01)
 G06F 16/31 (2019.01)
 G06F 16/33 (2019.01)
(52) U.S. Cl.
 CPC .......... *G06F 16/3338* (2019.01); *G06F 16/38* (2019.01); *G06F 16/93* (2019.01)

(56) References Cited

U.S. PATENT DOCUMENTS

| | | | | |
|---|---|---|---|---|
| 10,235,533 | B1* | 3/2019 | Thoren | G06F 21/6218 |
| 2003/0046282 | A1* | 3/2003 | Carlson | G06F 8/36 |
| 2009/0150168 | A1* | 6/2009 | Schmidt | G06Q 10/10 705/311 |
| 2016/0103823 | A1* | 4/2016 | Jackson, Jr. | G06F 40/30 704/9 |
| 2017/0161059 | A1* | 6/2017 | Wood | G06F 9/45558 |
| 2019/0325074 | A1* | 10/2019 | Ghezzi | G06F 8/36 |

OTHER PUBLICATIONS

Lynne Maynard, "ECS 3.0 Product Documentation," https://community.emc.com/docs/DOC-53956, Jul. 13, 2016, 3 pages.
Dell EMC, "Unisphere Management REST API Programmer's Guide," https://www.emc.com/collateral/TechnicalDocument/docu69331.pdf, Dell EMC Unity Family Version 4.3, Jan. 2018, 122 pages.
help.boomi.com, "Master Data Hub REST APIs," http://help.boomi.com/mdm/GUID-457504D2-5A67-4EBB-B8CB-D6E1159BB388.html, downloaded Jun. 27, 2018, 125 pages.
Jason Brownlee, "How to Develop a Deep Learning Bag-of-Words Model for Predicting Movie Review Sentiment," https://machinelearningmastery.com/deep-learning-bag-of-words-model-sentiment-analysis/, Oct. 20, 2017, 38 pages.
Olga Davydova, "7 Types of Artificial Neural Networks for Natural Language Processing," https://medium.com/@datamonsters/artificial-neural-networks-for-natural-language-processing-part-1-64ca9ebfa3b2, Sep. 26, 2017, 13 pages.
R. Collobert et al., "Natural Language Processing (almost) from Scratch," https://arxiv.org/pdf/1103.0398.pdf, Mar. 2, 2011, 47 pages.
www.dell.com, "Consulting for Microsoft SharePoint and SharePoint Online," https://www.dell.com/en-us/work/learn/sharepoint-and-onedrive-for-business, retrieved Jul. 26, 2018, 5 pages.
Donna Harman, "Information Retrieval: Chapter 3: Inverted Files," http://orion.lcg.ufrj.br/Dr.Dobbs/books/book5/chap03.htm, retrieved Jul. 12, 2018, 12 pages.
The Computer Language Company Inc., "Inverted File Definition from PC Magazine Encyclopedia," https://www.pcmag.com/encyclopedia/term/45332/inverted-file, retrieved Jul. 12, 2018, 2 pages.
Wikipedia, "PHP," https://en.wikipedia.org/wiki/PHP, Jul. 27, 2018, 24 pages.
Wikipedia, "Query Expansion," https://en.wikipedia.org/wiki/Query_expansion, Jul. 7, 2018, 3 pages.
DMTF, "Redfish API," https://www.dmtf.org/standards/redfish, 2018, 8 pages.
help.arcgis.com, "ArcGIS Resource Center: Versioned Database," http://help.arcgis.com/en/geodatabase/10.0/sdk/arcsde/concepts/versioning/basicprinciples/versioneddatabase.htm, retrieved Jul. 12, 2018, 1 page.
edndoc.esri.com, "Getting Started: What is a Versioned Database?" http://edndoc.esri.com/arcsde/9.1/general_topics/what_versioned_dbase.htm, retrieved Jul. 12, 2018, 4 pages.
Wikipedia, "WS-Management," https://en.wikipedia.org/wiki/WS-Management, Sep. 10, 2017, 3 pages.
tensorlayer.readthedocs.io, "API—Natural Language Processing," http:tensorlayer.readthedocs.io/en/latest/modules/hlp.html#iteration-fnction-for-training-embedding-matrix, Jul. 17, 2018, 18 pages.
Wikipedia, "Application Programming Interface," https://en.wikipedia.org/wiki/Application_programming_interface, Jul. 13, 2018, 8 pages.
Vangie Beal, "API—Application Program Interface," https://www.webopedia.com/TERM/A/API.html, 6 pages.
Wikipedia, "Word2vec," https://en.wikipedia.org/wiki/Word2vec, Jun. 21, 2018, 6 pages.
U.S. Appl. No. 16/041,353, filed in the name of Mainak Roy et al. Jul. 20, 2018 and entitled "Identification and Curation of Application Programming Interface Data from Different Sources."

* cited by examiner

GENERATING UNIFIED AND DYNAMICALLY UPDATABLE APPLICATION PROGRAMMING INTERFACE DOCUMENTATION FROM DIFFERENT SOURCES

FIELD

The field relates generally to information processing systems, and more particularly to the generation and dynamic modification of application programming interface (API) documentation from different source files.

BACKGROUND

Unifying redundant technologies is important for organizational success, and it has become important to achieve synergy within an organization among the computer technology products which may be coming from different sources.

For example, application programming interfaces (APIs) from different products are consumed heavily among customers. However, the structure, look and feel of the APIs across different product lines and their documentation are different for different set of APIs. In terms of usability, the differences between APIs and their documentation adversely affects user experience.

In web service hosting APIs should have corresponding electronic documentation describing the APIs in comprehensive enough detail to enable customers and application developers to use the API. In addition, APIs are dynamic in nature. For example, the generation, customization and modification of an API can happen instantly. As APIs evolve and new APIs are released, the documentation needs to be accurate and obviously reflect changes in the APIs. Currently, supporting reference documents require manual updates, causing a variety of associated process and quality complications, and resulting in time consuming processes that are not able to keep pace with the dynamic nature of the APIs. In addition, there is no centralized location for APIs corresponding to different products.

Accordingly, there is a need for an improved computer driven structure and process which is capable of dynamically modifying API documentation in response to API evolution, and providing unified API documentation from different source documents.

SUMMARY

In one embodiment, an apparatus comprises at least one processing platform including a plurality of processing devices. The processing platform is configured to generate a document corpus comprising a plurality of application programming interface electronic documents, wherein the plurality of application programming interface electronic documents are organized according to one or more application programming interface versions, receive a query from one or more users seeking information corresponding to one or more application programming interfaces, generate a subset of the plurality of application programming interface electronic documents in response to the query using one or more code artifacts, retrieve data corresponding to the one or more application programming interface versions, dynamically modify one or more of the plurality of application programming interface electronic documents in the subset of the plurality of application programming interface electronic documents based on the retrieved application programming interface version data, and transmit the subset of the plurality of application programming interface electronic documents to the one or more users.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Examples of public clouds may include, but are not limited to, Amazon Web Services® (AWS), Google Compute Engine® (GCE), and Microsoft Azure® Services platforms. Thus, enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment of the invention is implemented, other appropriate timescales that provide at least contemporaneous performance and output can be achieved.

As used herein "application programming interface (API)" refers to a set of subroutine definitions, protocols, and/or tools for building software. Generally, an API defines communication between software components. APIs permit programmers to write software applications consistent with an operating environment or website.

As used herein "application programming interface (API) documents" and "application programming interface (API) documentation" provide users with descriptions of the services offered by an API, and how to use those services. API documentation provides users with necessary information to develop and maintain applications using an API. Restrictions and/or limitations regarding API use may also be set forth in the documentation. API documentation can be retrieved from a variety of sources, including, but not limited to, databases of documentation files, blogs, forums, and question and answer websites. API documentation may include metadata information like Java annotations, which can be used by software components to implement custom behaviors or custom handling of the API.

Figure 1:
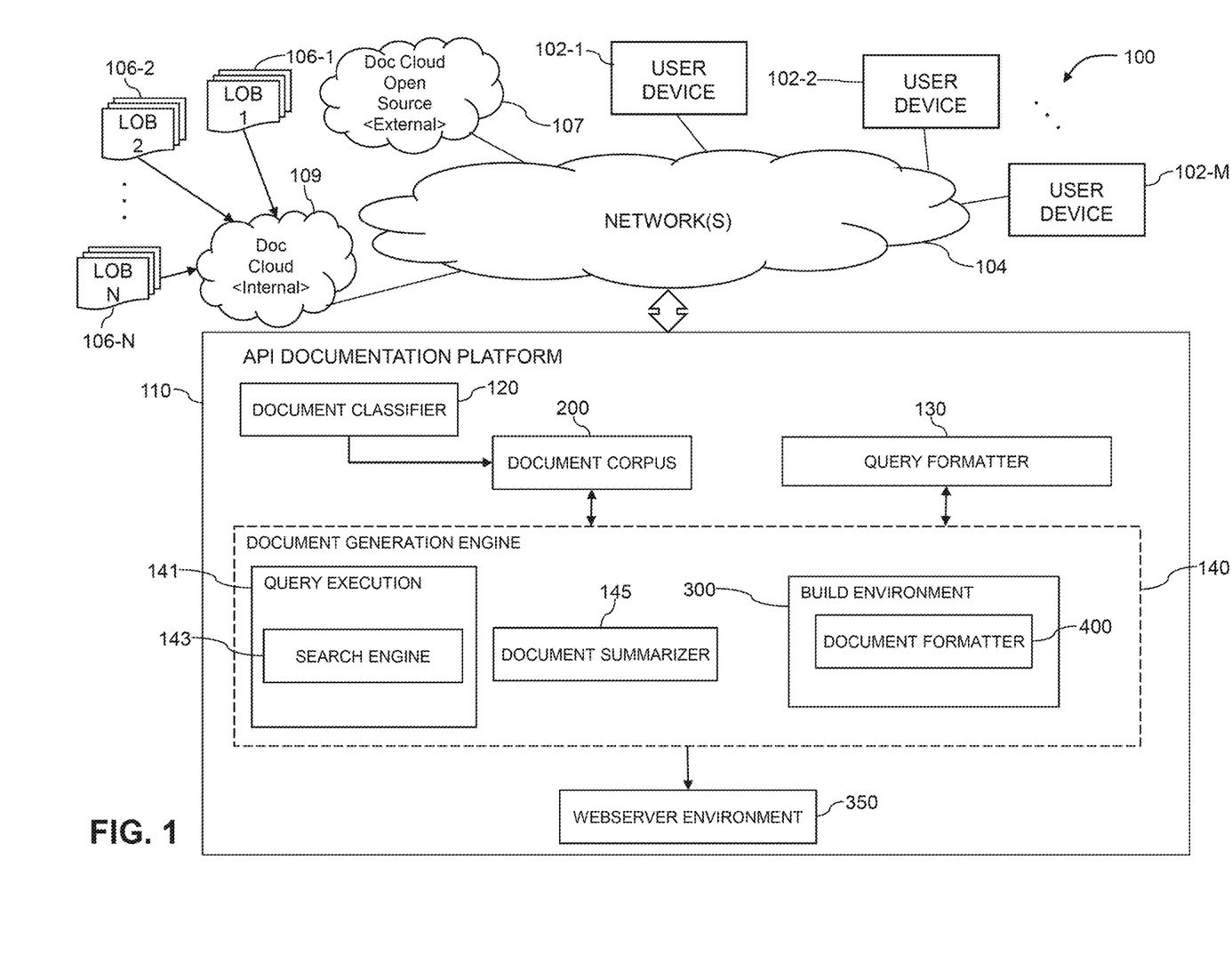
FIG. 1 is a block diagram of an information processing system comprising an application programming interface (API) documentation platform configured for generating and dynamically updating application programming interface (API) documentation from different source files in an illustrative embodiment.

FIG. 1 shows an information processing system 100 configured in accordance with an illustrative embodiment. The information processing system 100 comprises user devices 102-1, 102-2, . . . 102-M (collectively "user devices 102). The user devices 102 communicate over a network 104 with an API documentation platform 110.

The user devices 102 can comprise, for example, desktop, laptop or tablet computers, mobile telephones, or other types of processing devices capable of communicating with the API documentation platform 110 over the network 104. The variable M and other similar index variables herein such as K, L, N and Z are assumed to be arbitrary positive integers greater than or equal to two.

The term "user" herein is intended to be broadly construed so as to encompass numerous arrangements of human, hardware, software or firmware entities, as well as combinations of such entities. Document generation services may be provided for users utilizing one or more machine learning models, although it is to be appreciated that other types of infrastructure arrangements could be used. At least a portion of the available services and functionalities provided by the API documentation platform 110 in some embodiments may be provided under Function-as-a-Service ("FaaS") and/or Platform-as-a-Service (PaaS) models, including cloud-based FaaS and PaaS environments.

The API documentation platform 110 in the present embodiment is assumed to implement at least a portion of a document repository environment accessible to the user devices 102 over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The API documentation platform 110, on behalf of respective infrastructure tenants each corresponding to one or more users associated with respective ones of the user devices 102, implements a document generation engine 140 to perform API documentation generation. According to an embodiment, the infrastructure tenants are cloud infrastructure tenants. By way of example, the document generation services are assumed to include the establishment of a document corpus 200 comprising a versioned database for API related sources and reference documentations, dynamic updating of API information sets and query driven real-time and custom document generation on behalf of each of one or more users associated with respective user devices 102.

The API documentation platform 110 in some embodiments may be implemented as part of a cloud infrastructure in the form of a cloud-based system such as an AWS system. Other examples of cloud-based systems that can be used to provide at least portions of the API documentation platform 110 and possibly other portions of system 100 include GCE, and Microsoft Azure®.

In accordance with an embodiment of the present invention, the API documentation platform 110 provides automated tools for creating a centralized location for API related source and reference information, removing inconsistency across API documentation across different products, improving accessibility of the API documentation by tagging accurate content and key phrases for task-based queries, and providing a common user interface (UI) when reference material may be coming from multiple formats via different source code. Conventional techniques, which cannot be applied across varied input formats, do not allow for the generation and customization of API documentation, and are not able to keep pace with the dynamic nature of API revisions and updates.

The API documentation platform 110 in the embodiment of FIG. 1 illustratively comprises a document classifier 120, which outputs a plurality of classified API documents to a document corpus 200. In accordance with an embodiment of the present invention, the document classifier 120 receives as inputs from multiple sources a plurality of API documents respectively configured as electronic files in a variety of input formats. The input formats include, but are not necessarily limited to, extensible markup language (XML), JavaScript Object Notation (JSON), Pydoc, Microsoft Word®, txt, source code, or any other intelligible format.

The input sources include an internal document source (e.g., from within an enterprise supplying an API or API documentation), which includes, for example, an internal document cloud environment 109, and an external document source (e.g., from outside of an enterprise supplying an API or API documentation), which includes, for example, an external document cloud 107, such as, an open source cloud environment. In accordance with an embodiment of the present invention, the internal document cloud environment 109 can include, but is not necessarily limited to, documents from different lines-of-business (LOBs) 106-1, 106-2, . . . , 106-N, and a number of API documents based on, for example, a number of API products, a number of product versions, a number of document releases, and a number of types of product documents. The external document cloud environment 107 can include, but is not necessarily limited to, API documents from external databases of documentation files, and from social media sources, such as, for example, blogs, forums, and question and answer websites. Like the internal document cloud environment 109, the external document cloud environment 107 can include, but is not necessarily limited to documents from different LOBs, and the number of API documents can be based on, for example, a number of API products, product versions, document releases, and types of product documents. Similar to the external document cloud environment 107, the internal document cloud environment 109 can include, but is not necessarily limited to, internal databases of documentation files, and internal blogs, forums, and question and answer sites.

A plurality of classified API documents are output from the document classifier 120 to the document corpus 200. The classified documents are classified based on, for example, common API definitions and metadata, corresponding to, for example, API operations, parameters, and schema patterns. The classification accurately organizes API documentation based on API types or specified workflows for usage scenarios. Examples of a document classifier 120 and techniques for document classification are disclosed in U.S. patent application Ser. No. 16/041,353, filed on Jul. 20, 2018 and entitled "Identification and Curation of Application Programming Interface Data from Different Sources," which is incorporated by reference herein.

Figure 2:
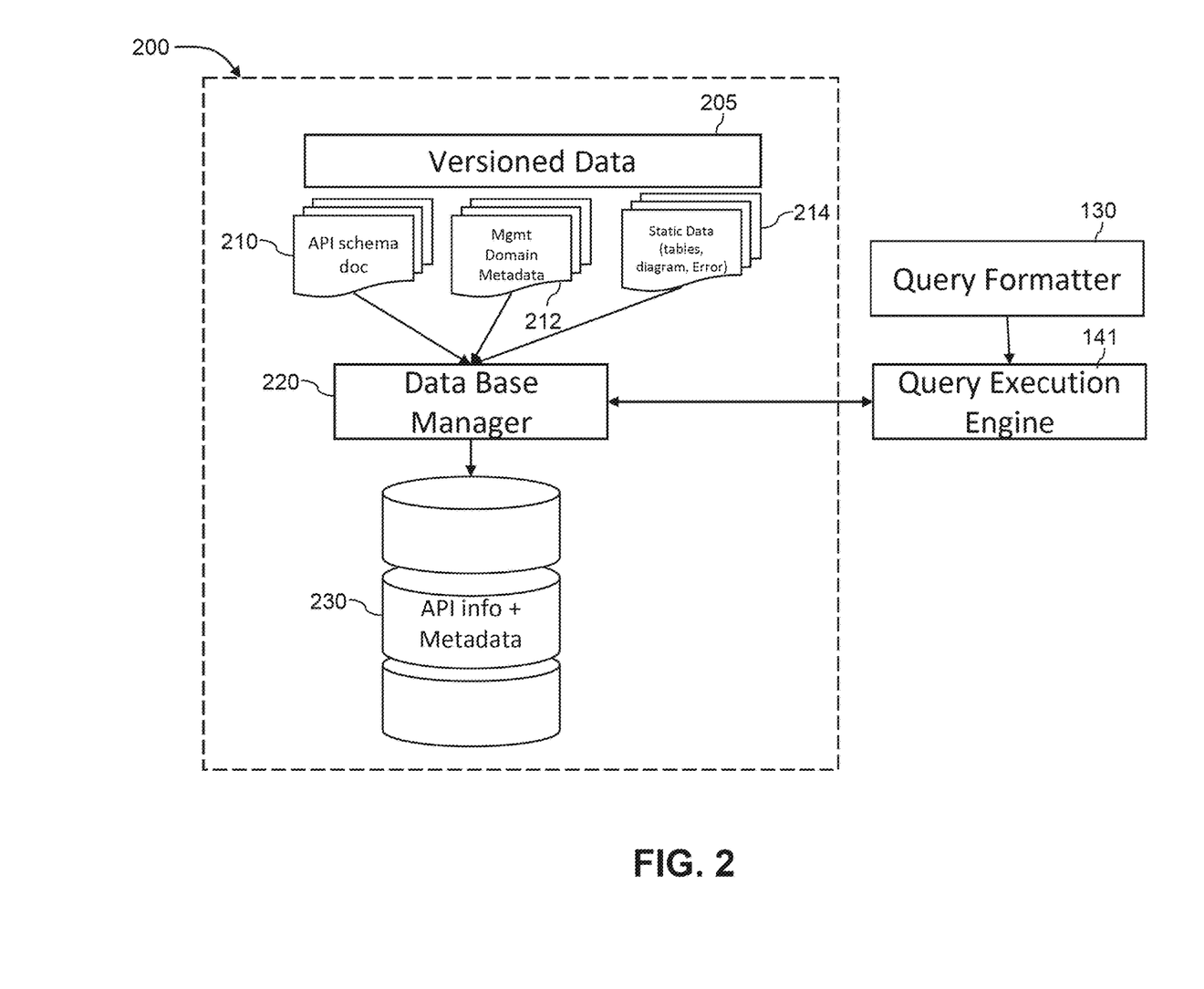
FIG. 2 is a block diagram of a document corpus of the application programming interface (API) documentation platform in an illustrative embodiment.

The document corpus 200 includes a collection of various formatted API documents stored in one or more databases. The various API documents are not necessarily related. Indexing in the document corpus 200 is performed using, for example inverted files, which are files that are indexed on attributes of the data itself. In accordance with some embodiments of the present invention, the API documentation platform 110 computes a Term-Document (T-D) matrix from the index, which describes the frequency of terms that occur in the collection of documents. Then, the API documentation platform 110 computes highly correlated terms using one or more approaches. For example, a high degree of correlation within the document corpus is achieved by performing Latent Semantic Analysis (LSA) on the T-D matrix.

In more detail, referring to FIG. 2, the document corpus 200 is a versioned database for API related sources and reference documentation, and includes versioned data 205 so that distinctions can be made between versions of APIs and API documents. According to some embodiments, a plurality of application programming interface electronic documents in the document corpus 200 are organized according to one or more application programming interface versions. The documents in the document corpus 200 are organized based on, for example, API information and metadata 230, corresponding to, for example, API schema documents 210, management domain metadata 212 and static data 214 from, for example, tables, diagrams and error messages associated with different APIs and API references. The document corpus 200 includes a database manager 220 configured to process inputs based on the API schema documents 210, management domain metadata 212 and static data 214, and organize and manage the inputs into the formatted API information and metadata 230 using, for example, inverted file indexing, T-D matrix computation and highly correlated term computation. API schema documents 210 refer to, for example, formatted documents for APIs, such as web services description language (WSDL)/managed object format (MOF) (for Web Services for Management (WSMAN)), conceptual schema definition language (CSDL) (for Redfish®), etc. Management domain metadata 212 refers to, for example, data required to organize and/or manage the APIs into logical sets, such as data regarding to which profile and/or workflow an API belongs. Static data 214 refers to, for example, information related to APIs, such as, for example, diagrams explaining a profile and/or workflow, and/or some generic tables that include mappings of standard return codes to extended description mapping, etc.

Referring to FIGS. 1 and 2, a query formatter 130 formats queries received from one or more users (via user devices 102) seeking information in the form of API documentation corresponding to one or more APIs. To generate a desired documentation set, the query formatter 130 sends formatted queries to the document generation engine 140. Formatted queries may call out user requested information such as, for example, API Generation/Version, API name/type, supported document format, storage versions, and/or content type. Some non-limiting examples of formatted queries include, but are not limited to, 14G+Redfish®+API format: pdf, Open Manage API format: json, 14G+Redfish®+API SubContent: Storage version: Current.

The query formatter 130 can create customized queries depending upon the requirements of document to be generated. Queries can include sub-categorization when a subset of the document corpus 200 is required. As noted above, the query can also include the version, and specify, for example, a version number (e.g., 14G indicating $14^{th}$ generation).

The query formatter 130 can further add a version-diff flag to the user query requesting generation of a document set which will show the differences between two provided versions of an API.

According to one or more embodiments of the present invention, the query may request API documentation to be in one or more supported document formats depending on user system specifications and/or needs of the users of the user devices 102. The supported document formats include, but are not necessarily limited to, hypertext markup language (HTML), portable document format (PDF) and/or JavaScript Object Notation (JSON). Accordingly, embodiments of the present invention can generate API documentation in one or more desired formats.

Queries can be received in plaintext form and/or via one or more forms having fields within which a user can select filters on which the query is to be based. Queries may also seek task-based API information, for example, referring to documentation related to a workflow, for instance, discovering or performing a particular type of monitoring, etc.

The document generation engine 140 of the API documentation platform 110 includes a query execution engine 141 comprising a search engine 143. According to one or more embodiments of the present invention, the search engine 143 is configured to execute query expansion by performing the certain operations on the document corpus 200. For example, the search engine 143 uses the highly correlated terms obtained from the document corpus 200 for automatic query expansion (AQE) in the search engine 143. As a result, a search query Q will be expanded to Q' internally, where Q' will include extra terms related to Q, which will enhance the search results. For example, an AQE algorithm may expand a query indicating a version and general category of API, such as $14^{th}$ generation integrated Dell Remote Access Controller APIs (14G iDRAC APIs) to specify APIs within the general API category, such as "14G iDRAC APIs wsman Redfish® racadm," which will enhance the search results.

In one or more embodiments, the search engine 143 also utilizes a ranking algorithm which ranks query results corresponding to a later date higher than query results corresponding to an earlier date, or employs some other specified ranking criteria. Such a ranking algorithm may be useful for distinguishing documentation based on documentation or API version. The search engine algorithms may incorporate one or more machine learning techniques. In general, machine learning techniques and components used in accordance with embodiments of the present invention may include, but are not necessarily limited to, neural networks, a Support Vector Machine (SVM), a Multilayer Perceptron (MLP), a deep learning model, decision trees, and clustering.

Once the query execution engine 141 parses a query, as explained in more detail herein below, the requested documentation based, for example, on the highest ranked query results, is retrieved from the document corpus 200 and a desired output is created. For multiple API or API documentation versions, data will be retrieved from versioned databases in the document corpus 200.

The document generation engine 140 of the API documentation platform 110 includes a document summarizer 145. According to one or more embodiments of the present invention, the document summarizer 145 is configured to take as input a set of documents based on the query results, and generate summaries for the documents based on multiple topics corresponding to industry standard approaches. For example, the topics include, but are not necessarily limited to, reference API documentation, class level documentation, domain oriented documentation, and/or workflow usage scenario documentation. The document summarizer 145 outputs the document summaries in a structured custom format, which may then be transformed into known standard formats (e.g., HTML, PDF, etc.) for user consumption. A structured custom format refers to, for example, an implementation specific format which can capture any API related information, which can further be used to generate formatted publishable documents in various formats (e.g., CSDL/WSDL/MOFs/PyDoc→structured custom format-→API published documents in various formats (e.g., HTML, PDF, etc.).

The document generation engine 140 of the API documentation platform 110 includes a build environment 300 comprising a document formatter 400. According to one or more embodiments of the present invention, in response to one or more queries, the build environment 300 is configured to generate a subset of the plurality of API electronic documents in the document corpus 200 using one or more code artifacts. The code artifacts comprise, but are not necessarily limited to, MOF and management information base (MIB) code artifacts.

Figure 3:
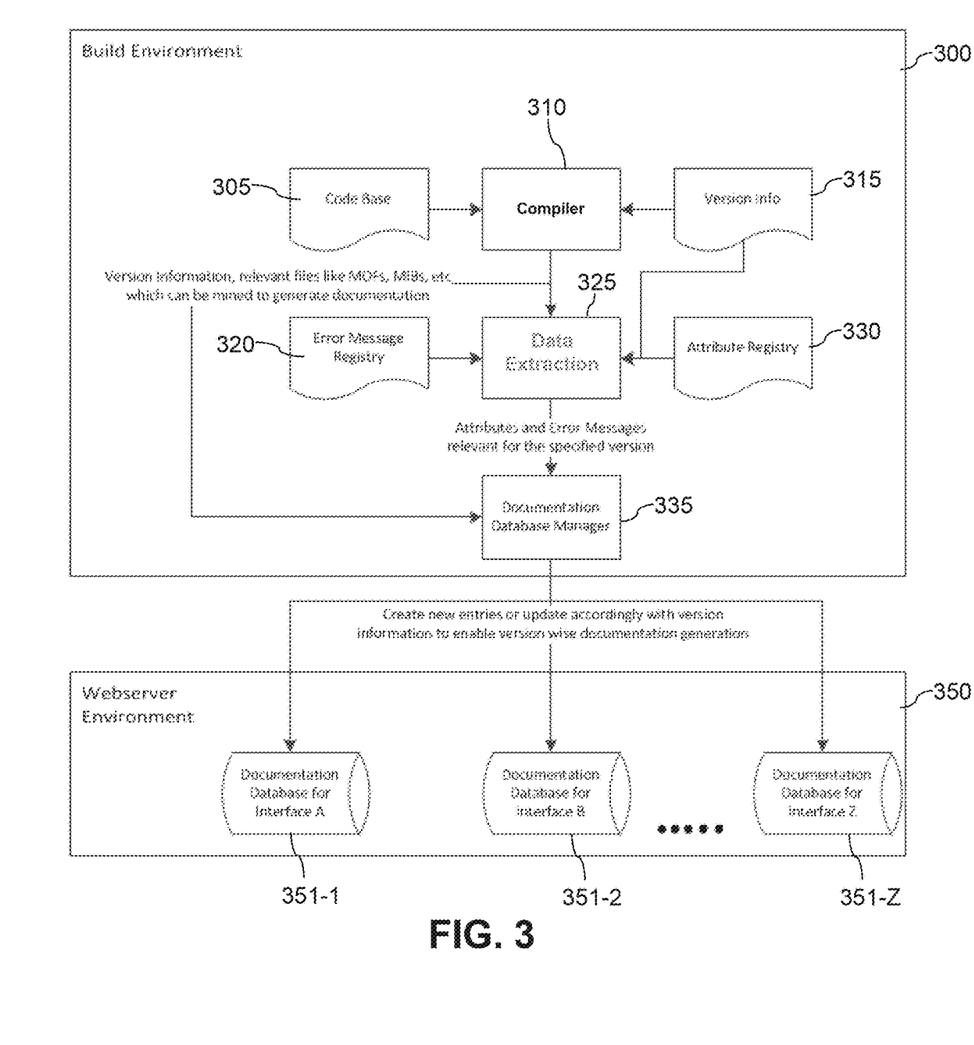
FIG. 3 is a block diagram of build and webserver environments of the application programming interface (API) documentation platform in an illustrative embodiment.

Referring to FIG. 3, in generating the subset of API documentation in response to a query, a compiler 310 retrieves relevant documentation files from a code base component 305. The files include, but are not necessarily limited to, MOF files, MIB files, and/or other code artifacts which are rich in documentation sources. The compiler 310 also retrieves version information 315 corresponding to the one or more API versions from documentation sources in the document corpus 200. The compiler 310 compiles the documentation files from a code base component 305 and the retrieved version information 315 and transmits the compiled data to a data extraction component 325. Based on specified release versions in the one or more queries, the data extraction component 325 extracts appropriate attributes and diagrams from an attribute registry 330 and error messages from an error message registry 320. The extracted data is relevant to the release versions specified in the one or more queries.

The information retrieved by the compiler 310 and the data extraction component 325 is processed by a documentation database manager (DDM) 335. The DDM 335 includes necessary artificial intelligence to create, update and/or delete appropriate table entries in one or more databases 351-1, 351-2, . . . , 351-Z respectively corresponding to various APIs, such as, for example, WSMAN, Representational State Transfer (REST), Simple Network Management Protocol (SNMP), RACADM (Remote Access Controller Admin), etc. The databases 351-1, 351-2, . . . , 351-Z are part of a webserver environment 350 of the API documentation platform 110, which is accessible to, for example, querying users via user devices 102 and web crawlers. The webserver environment 350 is used by server-side scripting languages to create pages on demand. The documentation databases 351-1, 351-2, . . . , 351-Z will remain staged (e.g., limited to internal access by, for example, validation engineers of an organization administering the API documentation platform 110) until a public release to customers is performed. Documentation from the staged database may be used by the developers and/or testers of an organization administering the API documentation platform 110. The released databases 351-1, 351-2, . . . , 351-Z will be open to the customers who can download documentation in any desired supported format, such as, for example, HTML, PDF, JSON, etc. The intelligence of the DDM 335 is achieved by execution of one or more machine learning techniques noted herein above.

In one or more embodiments of the present invention, the DDM 335 is configured to dynamically modify one or more of the API electronic documents in the document corpus 200 based on the retrieved API version data, and create new entries or update the databases 351-1, 351-2, . . . , 351-Z with the version information to enable documentation generation based on the API versions.

Figure 4:
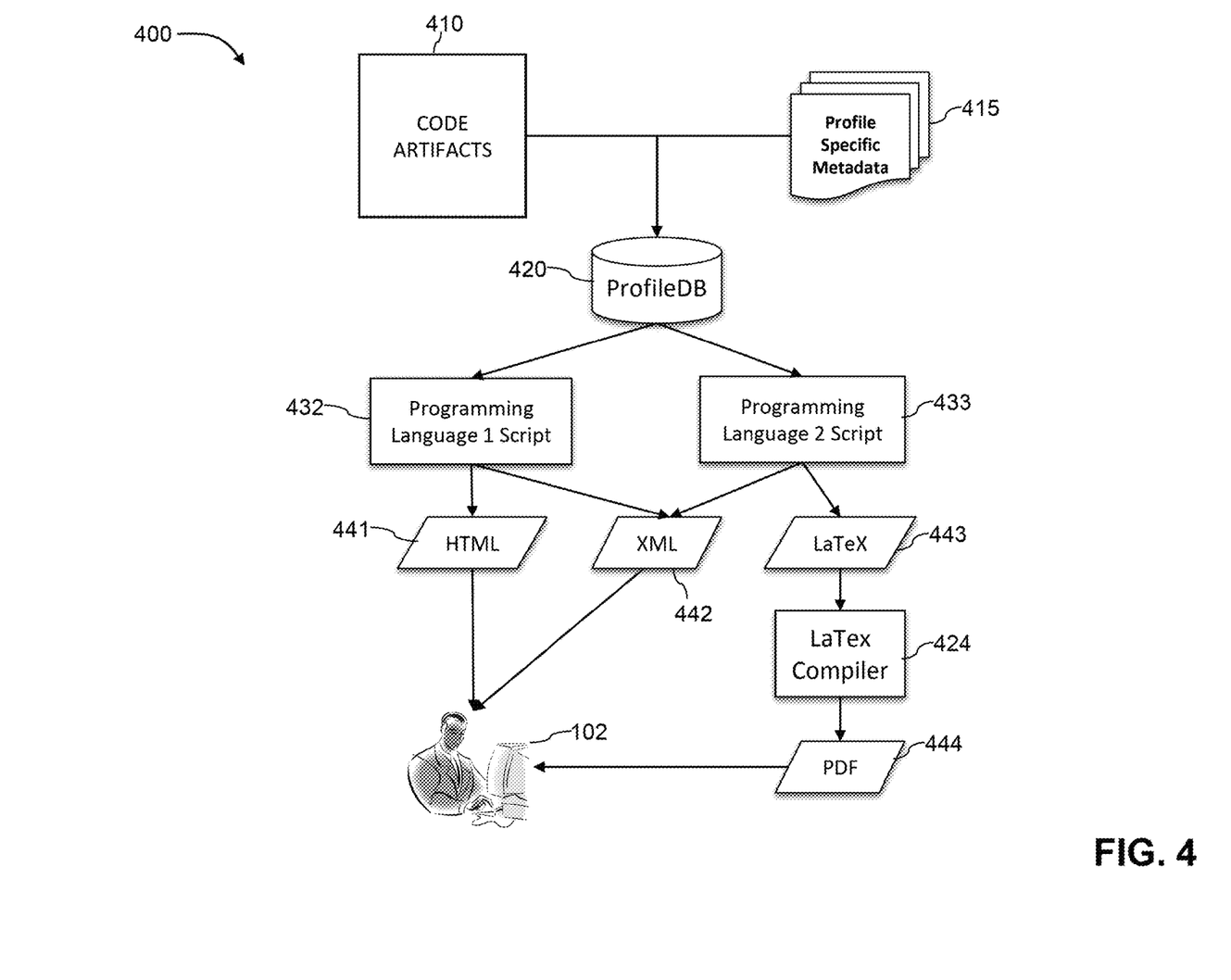
FIG. 4 is a block diagram of operation of a document formatter of a document generation engine of the application programming interface (API) documentation platform in an illustrative embodiment.

In response to the one or more queries, a subset of the documentation from the document corpus 200 is transmitted to the user devices 102 of one or more users via the webserver environment 350 and the network 104. The build environment 300 includes a document formatter 400, which formats the API documentation provided to the users in any desired supported format, such as, for example, HTML, PDF, JSON, etc. Referring to FIG. 4, a non-limiting example of a document formatter 400 formats API documentation in HTML, XML, and PDF formats 441, 442 and 444 for an end user on a user device 102. The document formatter 400 creates a profile API database 420 from multiple code artifacts 410 and profile specific metadata 415. The profile database 420 includes, for example, profiles for different API generations and/or versions. The code artifacts 410 include, for example, MOF files, MIB files, and/or other code artifacts which are rich in documentation sources. The profile specific metadata 415 refers to, for example, metadata corresponding to respective profiles, such as storage management, thermal management, network management, etc., which are used, for example, in WSMan documentation, where the concept of profiles is utilized.

Based on the query received from a user, the document formatter 400 will generate the desired documentation in the one or more formats 441, 442 and 444. The formats 441, 442 and 444 may be derived from scripts 432 and 433 based on different programming languages. The document formatter 400 is configured to process files into these scripts, and then transform the scripts into the desired formats 441, 442 and 444. In some embodiments, programming language 1 script 432 corresponds to PHP: Hypertext Preprocessor scripting language, and programming language 2 script 433 Python™ corresponds to programming language. As shown in FIG. 4, the document formatter 400 derives HTML and XML formats 441 and 442 from the programming language 1 script 432, and XML, LaTex and PDF formats 442, 443 and 444 from programming language 2 script 433. The document formatter 400 further comprises a LaTex compiler 424 to transform the documentation in LaTex format 443 to PDF format 444.

The document classifier 120, query formatter 130, document generation engine 140, document corpus 200, webserver environment 350, and other components of the API documentation platform 110 comprise further hardware and software required for running the API documentation platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

The databases or cloud environments discussed herein (e.g., document corpus 200, databases 351-1, 351-2, . . . , 351-Z and profile database 420) may comprise a database service, such as, but not necessarily limited to GCE Cloud Storage, Microsoft Azure Blob (Binary Large Object) Storage, DynamoDB, MongoDB, Amazon Aurora and Oracle database.

The document generation performed by the API documentation platform 110 can be performed based on real-time data from multiple sources retrieved over the network(s) 104, so that the information processing system can react to events as they happen. For example, the input data sources may include API document updates reflecting, for example, new API products, new API product versions or modifications and/or new or modified API guide releases captured in real-time, which may be processed by the API documentation platform 110 to generate API documentation for the end users of the user devices 102 reflecting real-time API and API documentation updates.

Although the document classifier 120, query formatter 130, document generation engine 140, document corpus 200, webserver environment 350, and other components of the API documentation platform 110 in the present embodiment are shown as part of the API documentation platform 110, at least a portion of document classifier 120, query formatter 130, document generation engine 140, document corpus 200, webserver environment 350, and other components of the API documentation platform 110 in other embodiments may be implemented on one or more other processing platforms that are accessible to the API documentation platform 110 over one or more networks. Such components can each be implemented at least in part within another system element or at least in part utilizing one or more stand-alone components coupled to the network 104.

The databases described herein are assumed to comprise one or more storage systems configured to store information relating to processing performed, data used, and to other functionality of the API documentation platform 110. Such storage systems can comprise any of a variety of different types of storage including network-attached storage (NAS), storage area networks (SANs), direct-attached storage (DAS) and distributed DAS, as well as combinations of these and other storage types, including software-defined storage.

Other particular types of storage products that can be used in implementing a given storage system of API documentation platform 110 in an illustrative embodiment include VNX® and Symmetrix VMAX® storage arrays, flash hybrid storage products such as Unity™, software-defined storage products such as ScaleIO™ and ViPR®, cloud storage products such as Elastic Cloud Storage (ECS), object-based storage products such as Atmos®, scale-out all-flash storage arrays such as XtremIO®, and scale-out NAS clusters comprising Isilon® platform nodes and associated accelerators, all from Dell EMC. Combinations of multiple ones of these and other storage products can also be used in implementing a given storage system in an illustrative embodiment.

It is assumed that the API documentation platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, document classifier 120, query formatter 130, document generation engine 140, document corpus 200, webserver environment 350, and other components of the API documentation platform 110, and the elements thereof can each be implemented in the form of one or more LXCs running on one or more VMs. Other arrangements of one or more processing devices of a processing platform can be used to implement document classifier 120, query formatter 130, document generation engine 140, document corpus 200, webserver environment 350, as well as other components of the API documentation platform 110. Other portions of the system 100 can similarly be implemented using one or more processing devices of at least one processing platform.

Distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different portions of the API documentation platform 110 to reside in different data centers. Numerous other distributed implementations of the API documentation platform 110 are possible.

Accordingly, one or each of the document classifier 120, query formatter 130, document generation engine 140, document corpus 200, webserver environment 350, and other components of the API documentation platform 110 can each be implemented in a distributed manner so as to comprise a plurality of distributed components implemented on respective ones of a plurality of compute nodes of the API documentation platform 110.

It is to be appreciated that these and other features of illustrative embodiments are presented by way of example only, and should not be construed as limiting in any way.

Accordingly, different numbers, types and arrangements of system components such as the document classifier 120, query formatter 130, document generation engine 140, document corpus 200, webserver environment 350, and other components of the API documentation platform 110, and the elements thereof can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments, functionality for the API documentation platform can be offered to cloud infrastructure customers or other users as part of FaaS and/or PaaS offerings.

The operation of the information processing system 100 will now be described in further detail with reference to the flow diagram of FIG. 5. The process 500 as shown includes steps 501 through 511, and is suitable for use in the system 100 but is more generally applicable to other types of information processing systems comprising an API documentation platform configured for generating and dynamically updating API documentation from different source files.

In step 501, the process 500 includes generating a document corpus comprising a plurality of API electronic documents. The plurality of API electronic documents are organized according to one or more API versions.

In step 503, a query is received from one or more users seeking information corresponding to one or more APIs. In accordance with one or more embodiments of the present invention, the query is formatted based on the one or more supported document formats. A flag can be generated for the query to seek a documentation set which illustrates differences between at least two of API versions.

In some embodiments, the process includes indexing of the document corpus, and computation of a T-D matrix from the index. Highly correlated terms of the electronic documents in the document corpus are computed via analysis of the T-D matrix. By employing an AQE algorithm, the query is expanded using the highly correlated terms.

In step 505, in response to the query, a subset of the plurality of API electronic documents is generated using one or more code artifacts. The code artifacts comprise, for example, MOF and MIB code artifacts.

In step 507, data corresponding to the one or more API versions is retrieved. The retrieved API version data comprises, for example, error messages and/or supported attributes relevant to at least one of the API versions. In step 509, one or more of the plurality of API electronic documents in the subset of the plurality of API electronic documents is dynamically modified based on the retrieved API version data. In dynamically modifying the one or more of the plurality of API electronic documents in the subset, one or more table entries in one or more databases specific to one or more APIs is created, updated and/or deleted.

In step 511 the subset of the plurality of API electronic documents is transmitted to the one or more users in response to the query. Prior to receipt of the subset of API electronic documents, the documents are transformed from one or more document formats into one or more supported document formats for consumption by one or more on the user devices.

A ranking algorithm may be employed which ranks electronic documents of the plurality of API electronic documents corresponding to a later date higher than electronic documents of the plurality of API electronic documents corresponding to an earlier date.

Figure 5:
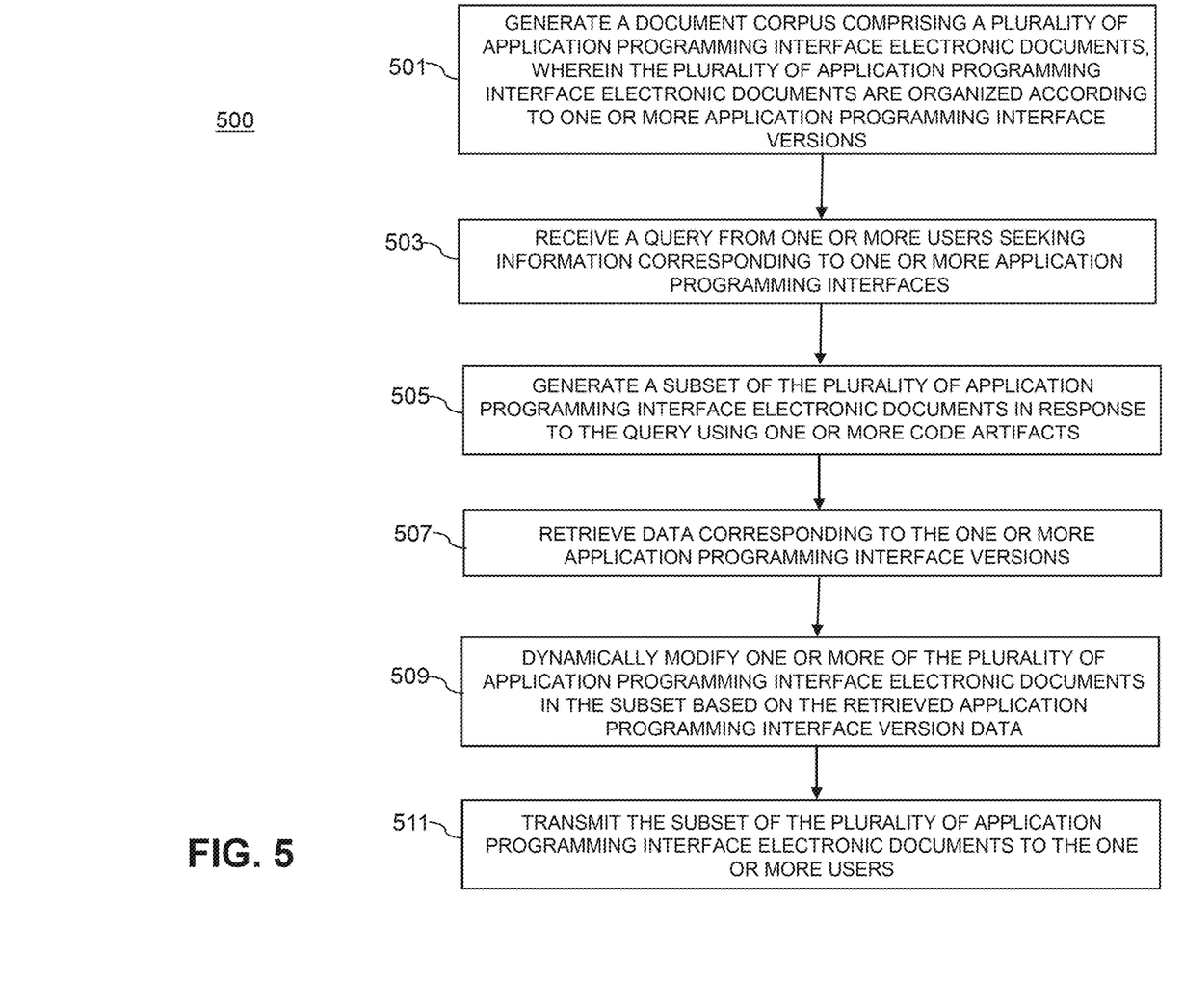
FIG. 5 is a flow diagram of a process for generating and dynamically updating application programming interface (API) documentation from different source files in an illustrative embodiment.

It is to be appreciated that the FIG. 5 process and other features and functionality described above can be adapted for use with other types of information systems configured to execute document generation services on an API documentation platform or other type of processing platform.

The particular processing operations and other system functionality described in conjunction with the flow diagram of FIG. 5 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 5 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with an API documentation platform as disclosed herein can provide a number of significant advantages relative to conventional arrangements. For example, embodiments of the present invention are configured to address problems with creating a unified set of API documentation from different sets of source documents and dynamically changing the reference documentation in case of any updates to the APIs and/or API documents. Currently, there are no techniques or solutions which provide a centralized location to search for, design and retrieve APIs for different products. Furthermore, there are no techniques or solutions which allow for automatic and real-time updates to keep pace with API evolution, updates and upgrades.

As an advantage, embodiments of the present invention permit classified API documents to be stored in an open-source centralized repository for API related source and reference information, so that inconsistency can be removed across API documentation across different products. In another advantage, embodiments of the present invention improve accessibility of the API documentation by formatting and expanding queries, by organizing, updating and retrieving documentation according to API versions, and by providing a webserver environment through which users can specify documentation format, and retrieve documentation from interface specific databases. In another advantage, embodiments of the present invention provide a unified platform to avoid any conflicts among different API product lines, which can simultaneously produce API documents having a unified format for different API products.

Conventional computer driven techniques for generation of API documentation result in inconsistencies between API documentation across different products. Currently, there is no mechanism for generating API documentation in multiple formats via different source code, and for capturing data reflecting real-time updates for APIs and API documents. Conventional techniques also fail to provide task-based API information.

Presently, there are no processes for establishing a versioned database for API related sources and reference documentation, dynamic updating of API information sets, or real-time and custom API document generation.

Advantageously, the embodiments of the present invention deliver a unified solution that can be implemented on any set of APIs to automatically generate harmonized API documentation, even though API structures are different for different products. Conventional tools are custom-made for a specific type of inputs. However, the document generation structure of the API documentation platform of the embodiments of the present invention can consume content from any type of input file and generate API guides in multiple formats.

The embodiments of the present invention advantageously ensure accessibility of API documentation across web searches by generating action/task driven reference documents via appropriate tagging, and ensure the same overall appearance for API documentation sets irrespective of the variation in source code or content type. By providing for dynamic and real-time updates to API documentation and databases, and seeking out version and error message information, the embodiments of the present invention also ensure that customers will receive the latest set of API reference guides, even if there are minimum changes in the API sets. Embodiments of the present invention extending search functionality so that users can generate custom documents for their own specific requirements and formats. With the disclosed embodiments, different formats of documents are automatically generated from the same underlying information sources and databases.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system components such as the API documentation platform 110 or portions thereof are illustratively implemented for use by tenants of such a multi-tenant environment.

As mentioned previously, cloud infrastructure as disclosed herein can include cloud-based systems such as AWS, GCE and Microsoft Azure. Virtual machines provided in such systems can be used to implement at least portions of one or more of a computer system and an API documentation platform in illustrative embodiments. These and other cloud-based systems in illustrative embodiments can include object stores such as AWS S3, GCE Cloud Storage, and Microsoft Azure Blob Storage.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
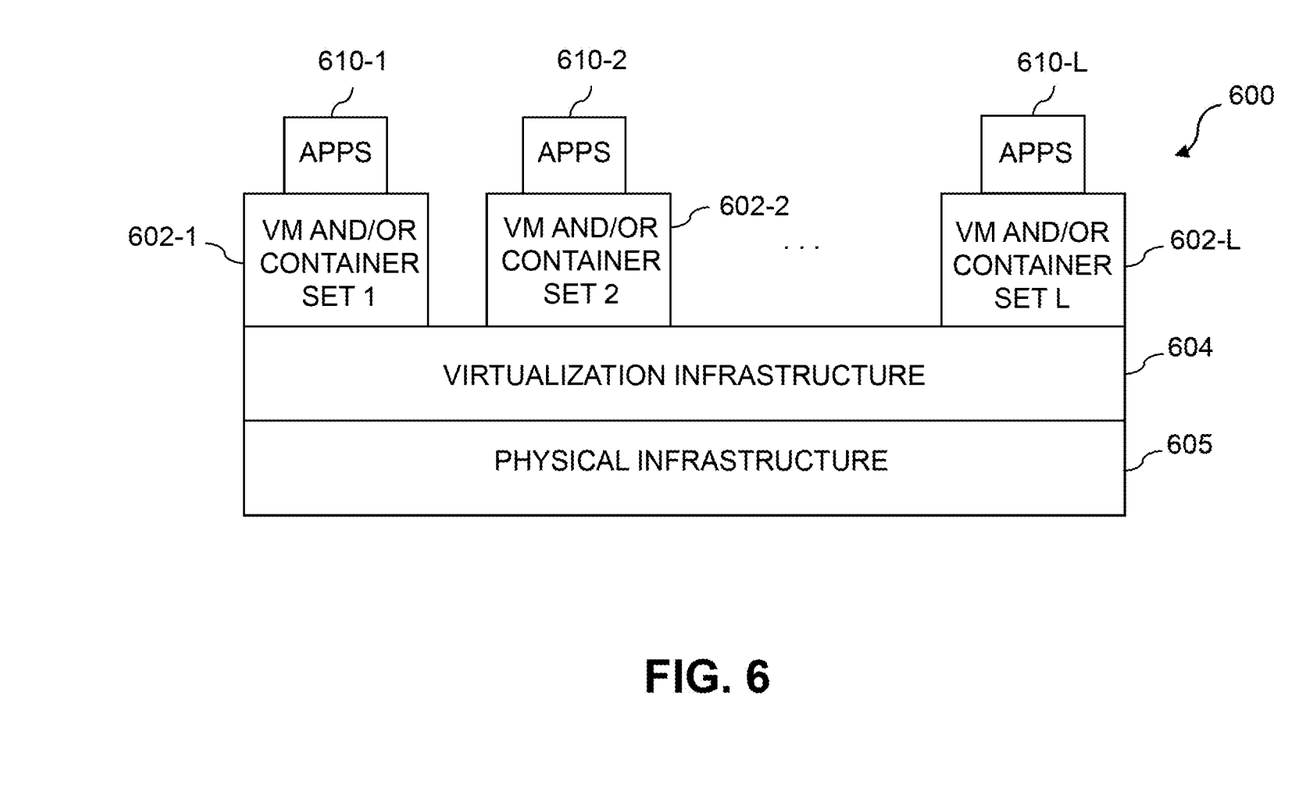
FIGS. 6 and 7 show examples of processing platforms that may be utilized to implement at least a portion of an information processing system in illustrative embodiments.
Figure 7:
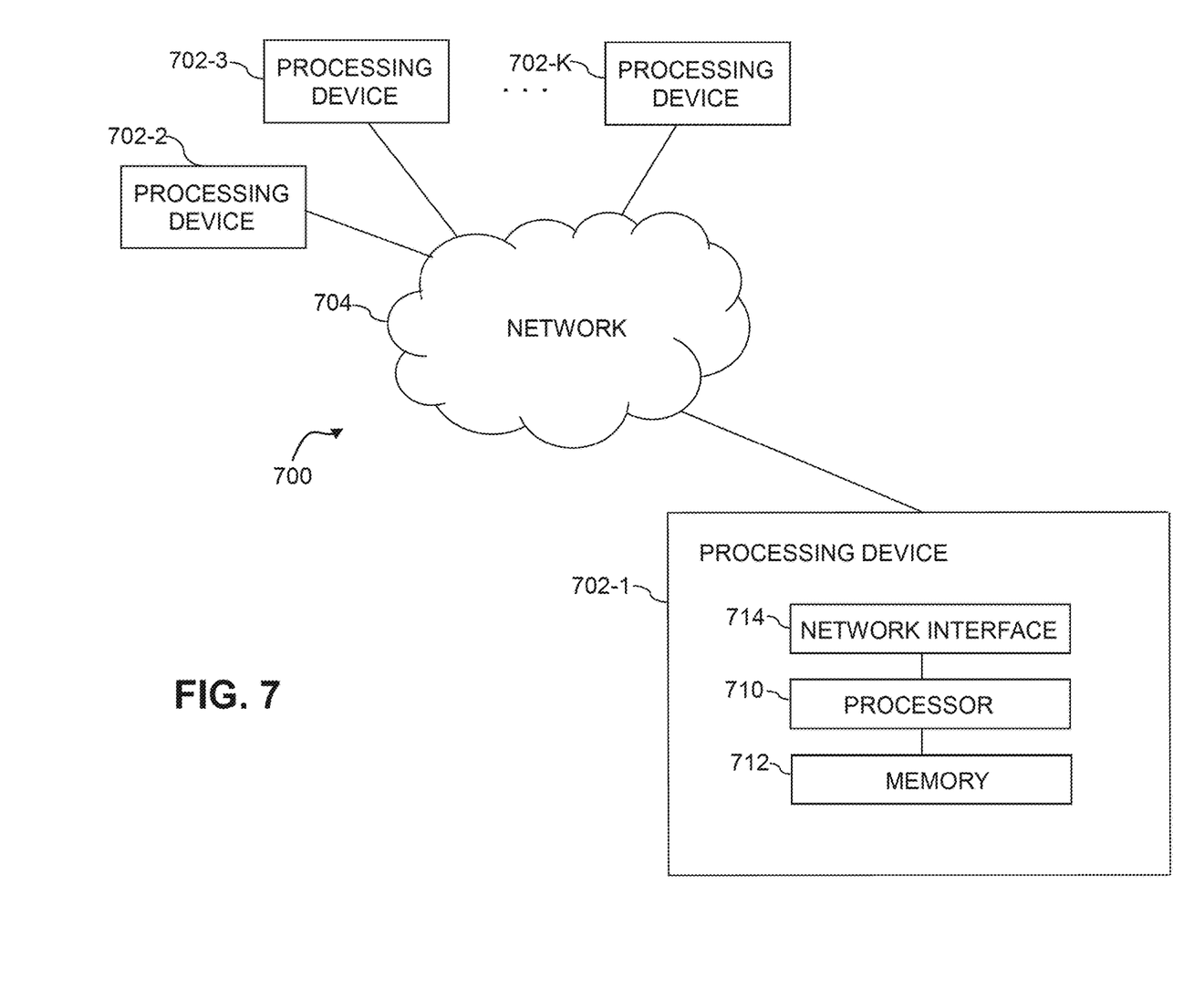

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide document generation functionality of the type described above for one or more processes running on a given one of the VMs. For example, each of the VMs can implement user specific layout management, document theme analysis, document management and/or feedback and training for one or more processes running on that particular VM.

An example of a hypervisor platform that may be used to implement a hypervisor within the virtualization infrastructure 604 is the VMware® vSphere® which may have an associated virtual infrastructure management system such as the VMware® vCenter™. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can provide document generation functionality of the type described above for one or more processes running on different ones of the containers. For example, a container host device supporting multiple containers of one or more container sets can implement one or more instances of user specific layout management, document theme analysis, document management and/or feedback and training.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712. The processor 710 may comprise a microprocessor, a microcontroller, an application-specific integrated circuit (ASIC), a field-programmable gate array (FPGA) or other type of processing circuitry, as well as portions or combinations of such circuitry elements.

The memory 712 may comprise random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the API documentation platform 110 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and API documentation platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
 at least one processing platform comprising a plurality of processing devices;
 said at least one processing platform being configured to:
 generate a document corpus comprising a plurality of application programming interface electronic documents, wherein the plurality of application programming interface electronic documents are organized according to one or more application programming interface versions;

receive a query from one or more users seeking information corresponding to one or more application programming interfaces;

generate a subset of the plurality of application programming interface electronic documents in response to the query using one or more code artifacts;

retrieve data corresponding to the one or more application programming interface versions;

dynamically modify one or more of the plurality of application programming interface electronic documents in the subset of the plurality of application programming interface electronic documents based on the retrieved application programming interface version data; and transmit the subset of the plurality of application programming interface electronic documents to the one or more users in response to the query.

2. The apparatus of claim 1 wherein said at least one processing platform is further configured to transform the subset of the plurality of application programming interface electronic documents from one or more document formats into one or more supported document formats.

3. The apparatus of claim 2 wherein said at least one processing platform is further configured to format the query based on the one or more supported document formats.

4. The apparatus of claim 1 wherein said at least one processing platform is further configured to create a flag in connection with the query so that the subset of the plurality of application programming interface electronic documents illustrates differences between at least two of the application programming interface versions.

5. The apparatus of claim 1 wherein the retrieved application programming interface version data comprises at least one of error messages and supported attributes relevant to at least one of the application programming interface versions.

6. The apparatus of claim 1 wherein the code artifacts comprise at least one of managed object format (MOF) and management information base (MIB) code artifacts.

7. The apparatus of claim 1 wherein, in dynamically modifying the one or more of the plurality of application programming interface electronic documents in the subset, said at least one processing platform is further configured to at least one of create, update and delete one or more table entries in one or more databases specific to one or more interfaces.

8. The apparatus of claim 1 wherein said at least one processing platform is further configured to perform indexing of the document corpus, and to compute a term-document matrix from the index.

9. The apparatus of claim 1 wherein said at least one processing platform is further configured to compute highly correlated terms of the electronic documents in the document corpus.

10. The apparatus of claim 9 wherein said at least one processing platform is further configured to expand the query using the highly correlated terms.

11. The apparatus of claim 1 wherein said at least one processing platform is further configured to employ an automatic query expansion algorithm to expand the query.

12. The apparatus of claim 1 wherein said at least one processing platform is further configured to employ a ranking algorithm which ranks electronic documents of the plurality of application programming interface electronic documents corresponding to a later date higher than electronic documents of the plurality of application programming interface electronic documents corresponding to an earlier date.

13. A method comprising:

generating a document corpus comprising a plurality of application programming interface electronic documents, wherein the plurality of application programming interface electronic documents are organized according to one or more application programming interface versions;

receiving a query from one or more users seeking information corresponding to one or more application programming interfaces;

generating a subset of the plurality of application programming interface electronic documents from the database in response to the query using one or more code artifacts;

retrieving data corresponding to the one or more application programming interface versions;

dynamically modifying one or more of the plurality of application programming interface electronic documents in the subset of the plurality of application programming interface electronic documents based on the retrieved application programming interface version data; and transmitting the subset of the plurality of application programming interface electronic documents to the one or more users in response to the query;

wherein the method is performed by at least one processing platform comprising at least one processing device comprising a processor coupled to a memory.

14. The method of claim 13 further comprising transforming the subset of the plurality of application programming interface electronic documents from one document format into one or more supported document formats.

15. The method of claim 14 further comprising formatting the query based on the one or more supported document formats.

16. The method of claim 13 further comprising creating a flag in connection with the query so that the subset of the plurality of application programming interface electronic documents illustrates differences between at least two of the application programming interface versions.

17. The method of claim 13 wherein the retrieved application programming interface version data comprises at least one of error messages and supported attributes relevant to at least one of the application programming interface versions.

18. The method of claim 13 wherein the code artifacts comprise at least one of managed object format (MOF) and management information base (MIB) code artifacts.

19. The method of claim 13 wherein dynamically modifying the one or more of the plurality of application programming interface electronic documents in the subset comprises at least one of creating, updating and deleting one or more table entries in one or more databases specific to one or more interfaces.

20. A computer program product comprising a non-transitory processor-readable storage medium having stored therein program code of one or more software programs, wherein the program code when executed by at least one processing platform causes said at least one processing platform to:

generate a document corpus comprising a plurality of application programming interface electronic documents, wherein the plurality of application programming interface electronic documents are organized according to one or more application programming interface versions;

receive a query from one or more users seeking information corresponding to one or more application programming interfaces;

generate a subset of the plurality of application programming interface electronic documents in response to the query using one or more code artifacts;

retrieve data corresponding to the one or more application programming interface versions;

dynamically modify one or more of the plurality of application programming interface electronic documents in the subset of the plurality of application programming interface electronic documents based on the retrieved application programming interface version data; and transmit the subset of the plurality of application programming interface electronic documents to the one or more users in response to the query.

* * * * *